United States Patent

Priest

(10) Patent No.: US 9,012,752 B2
(45) Date of Patent: Apr. 21, 2015

(54) PITCH WATCH APPARATUS AND METHODS OF USE THEREOF

(71) Applicant: Julia Priest, Brighton, MA (US)

(72) Inventor: Julia Priest, Brighton, MA (US)

(*) Notice: Subject to any disclaimer, the term of this patent is extended or adjusted under 35 U.S.C. 154(b) by 108 days.

(21) Appl. No.: 13/909,308

(22) Filed: Jun. 4, 2013

(65) Prior Publication Data

US 2013/0319206 A1    Dec. 5, 2013

Related U.S. Application Data

(60) Provisional application No. 61/655,614, filed on Jun. 5, 2012.

(51) Int. Cl.
*G09B 15/04* (2006.01)
*G09B 15/00* (2006.01)
*G10G 7/02* (2006.01)

(52) U.S. Cl.
CPC . *G09B 15/00* (2013.01); *G10G 7/02* (2013.01)

(58) Field of Classification Search
CPC ................................. G10G 7/02; G09B 15/00
USPC .......................................................... 84/470 R
See application file for complete search history.

(56) References Cited

U.S. PATENT DOCUMENTS

| | | | | |
|---|---|---|---|---|
| 2,726,568 A * | 12/1955 | Lake | ............................... | 84/456 |
| 2,837,954 A * | 6/1958 | Kratt | ............................... | 84/456 |
| D195,579 S * | 7/1963 | Ruderian | ..................... | D21/460 |
| 6,245,981 B1 * | 6/2001 | Smith | ............................. | 84/474 |
| 8,328,055 B1 * | 12/2012 | Snyder | ........................... | 224/197 |
| 2013/0188322 A1 * | 7/2013 | Lowe | ............................ | 361/749 |

* cited by examiner

*Primary Examiner* — Jianchun Qin

(57) ABSTRACT

The present invention features apparatuses that include a wristband and a pitch pipe rotatably attached to the wristband, wherein the apparatuses are disposed to be worn on a user's wrist. The invention further features methods of use thereof.

14 Claims, 3 Drawing Sheets

– 1 –
PITCH WATCH APPARATUS AND METHODS OF USE THEREOF

CROSS-REFERENCE TO RELATED APPLICATIONS

This application claims the benefit of U.S. provisional application No. 61/655,614, filed Jun. 5, 2012, which is hereby incorporated by reference in its entirety.

BACKGROUND OF THE INVENTION

Teachers of toddler music and movement classes need to sing songs in a key in which children can sing along, and it is best for the children if the teachers sing a given song in the same key every time. For this purpose, teachers need to have a pitch pipe at hand for periodic reference throughout every class. Teachers also periodically role-model gross-motor actions such as dancing, jumping, spinning, skipping, and hopping during class. A pitch pipe held in the teacher's pocket frequently falls out and gets picked up, and perhaps even mouthed, by a toddler. There is a need in the art to provide improved pitch pipe apparatuses and methods of use thereof.

SUMMARY OF THE INVENTION

The invention features apparatuses that safely and conveniently hold a pitch pipe, e.g., on a user's wrist. Such an apparatus is termed a "pitch watch."

Advantageously, apparatuses of the invention provide continuous hands-free access to the attached pitch pipe and avoid the need to store the pitch pipe, e.g., in a pocket.

Accordingly, the invention features an apparatus including: a) a wristband; and b) a pitch pipe rotatably attached to the wristband, wherein the apparatus is disposed to be worn on a user's wrist. In some embodiments, the pitch pipe includes a post disposed through the center of the pitch pipe, and wherein the post is rotatably attached to the wristband.

The invention further features an apparatus including a) a wristband including a primary band and an auxiliary band, wherein at least a portion of the auxiliary band is disposed above the outer surface of the primary band and wherein the auxiliary band is attached to the primary band by at least both ends of the auxiliary band; and b) a pitch pipe rotatably attached to the wristband, the pitch pipe including a post disposed through the center of the pitch pipe, wherein the post is rotatably attached to the auxiliary band and does not penetrate the primary band, wherein the apparatus is disposed to be worn on a user's wrist.

In some embodiments, the auxiliary band is woven through the primary band and includes a plurality of non-contiguous portions disposed above the outer surface of the primary band. The apparatus may also include a plurality of decorative rings disposed between the primary band and the auxiliary band. In some embodiments, the thickness of the primary band is about 2 millimeters, and/or the width of the primary band is about 40 millimeters. The wristband may include any material, e.g., leather.

In some embodiments, the apparatus further includes an adjustable mechanism for fitting said apparatus to said user's wrist. The adjustable mechanism may include, for example, a buckle attached to one end of the wristband and a plurality of holes at the other end of the wristband, or may include Velcro attached to each end of said wristband.

In some embodiments, the pitch pipe includes: i) a plurality of metal reeds inside the pitch pipe; and ii) proximal to each reed, an opening in the pitch pipe to allow the user to blow air over the reed, thereby causing the reed to resonate at a preselected frequency. The pitch pipe may include, e.g., 13 metal reeds substantially tuned to Middle C, C#, D, D#, E, F, F#, G, G#, A, A#, B, and High C, respectively.

In some embodiments, the pitch pipe is substantially disk-shaped.

In some embodiments, the diameter of the pitch pipe is about 65 millimeters.

The invention further features a method of using an apparatus described herein, the method including the steps of: fastening the apparatus to a user's wrist; and blowing air into the pitch pipe, thereby producing a desired pitch.

By "about" is meant ±10% of the recited value.

By "outer surface" in reference to a wristband or a primary band thereof is meant the band surface that is not intended to be in direct contact with the user's wrist.

By "pitch pipe" is meant an apparatus used to provide a pitch reference, e.g., for musicians, music teachers, or music students, and of suitable size to be incorporated into an apparatus of the invention that is worn on a user's wrist.

By "wristband" is meant a strap of material that is disposed to be worn on a user's wrist, e.g., similar to a watch band, and is sufficiently sturdy to hold a pitch pipe substantially against a user's wrist.

Other features and advantages of the invention will be apparent from the detailed description and from the claims.

DETAILED DESCRIPTION OF THE INVENTION

Figure 1:
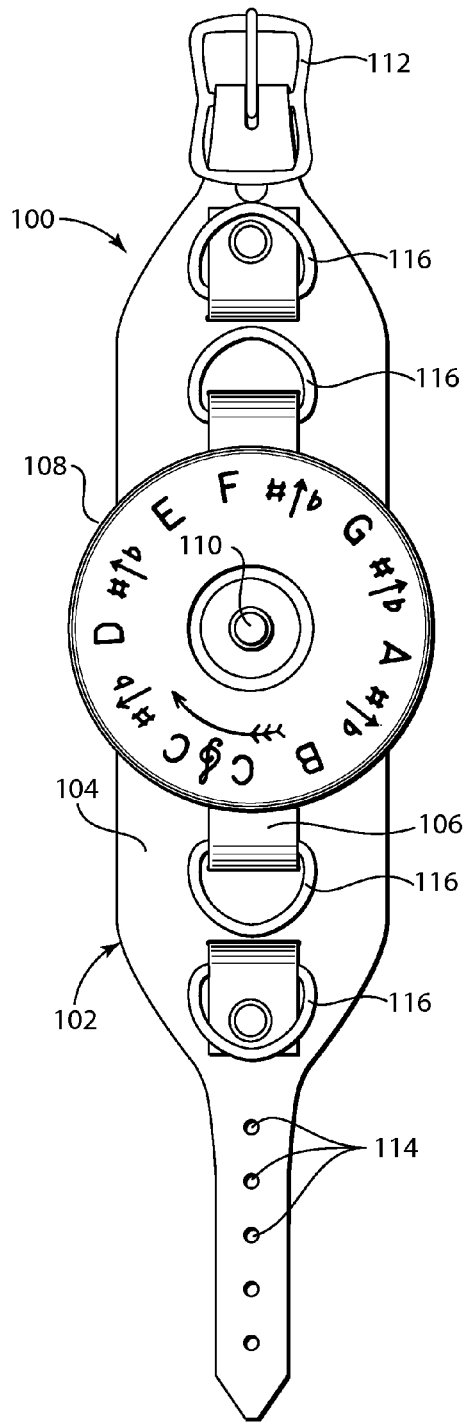
FIG. 1 is a top view of an apparatus of the invention.
Figure 2:
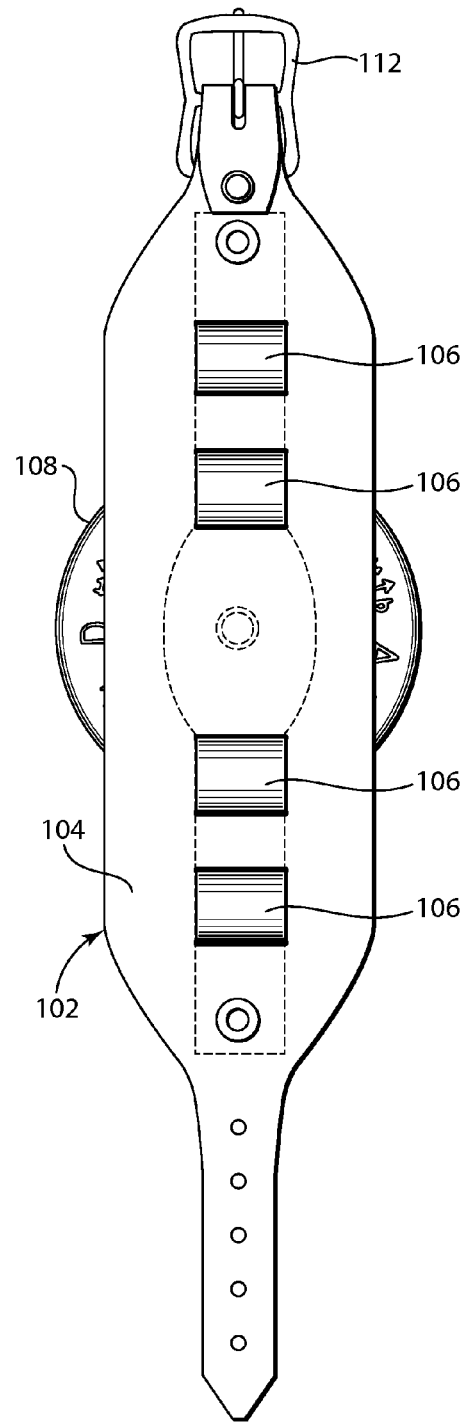
FIG. 2 is a bottom view of the apparatus shown in FIG. 1.
Figure 3:
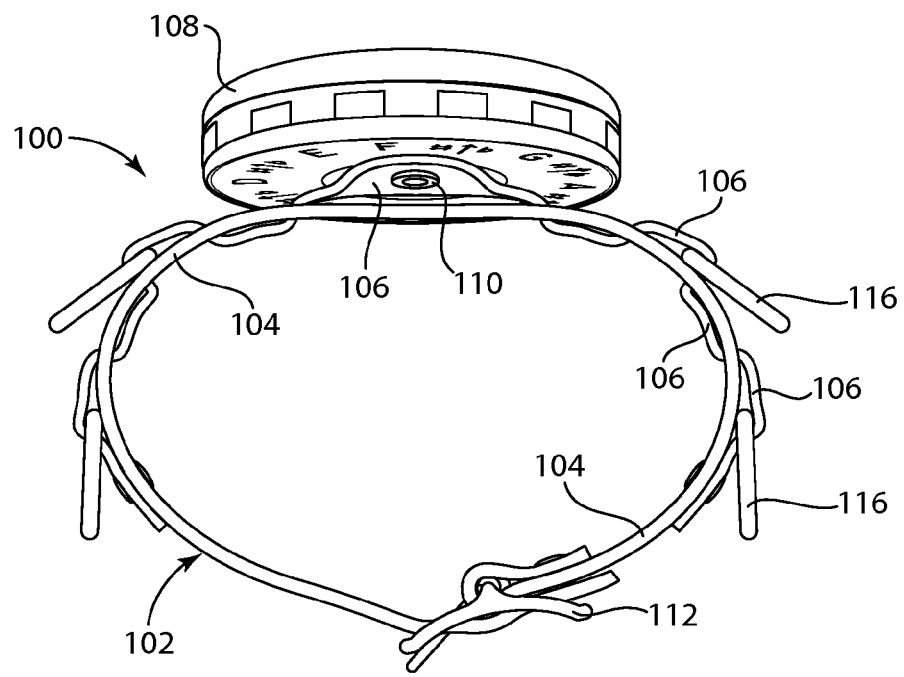
FIGS. 3 and 4 are side views of the apparatus shown in FIG. 1.
Figure 4:
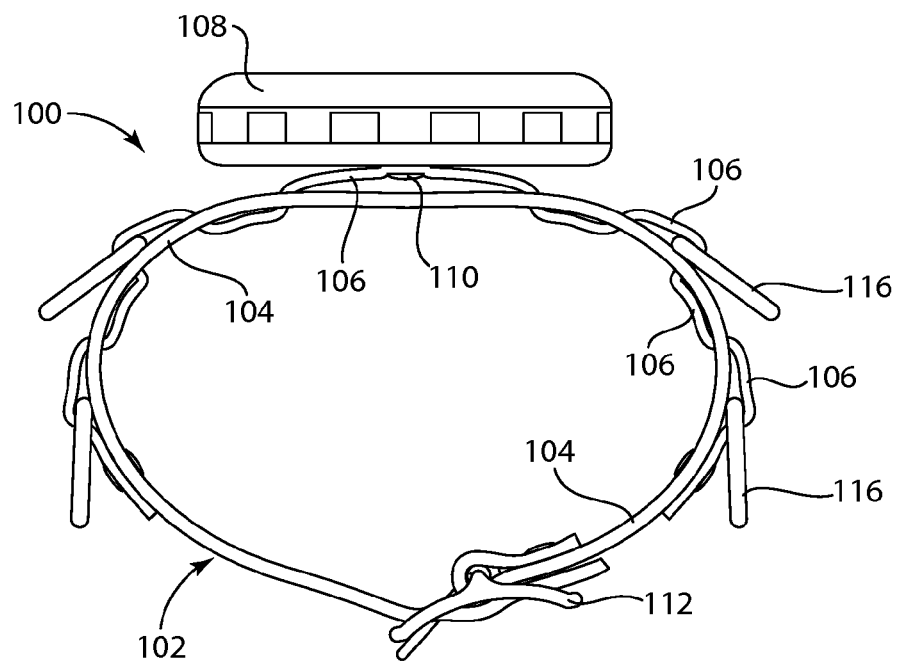

There now follows a description of particular embodiments of the invention, which should not be construed as limiting.

Referring to FIGS. 1-4, apparatus 100 includes wristband 102, which in turn includes primary band 104 and auxiliary band 106 woven through primary band 104; and disk-shaped pitch pipe 108 rotatably attached to auxiliary band 106 by post 110. Primary band 104 also includes adjustable buckle 112 at one end and holes 114 at the other end, which allow apparatus 100 to be fitted and secured to a user's wrist. Wristband 102 also includes decorative D-rings 116 disposed between primary band 104 and auxiliary band 106.

Pitch pipe 108 is commercially available and includes thirteen reeds (Middle C, C#, D, D#, E, F, F#, G, G#, A, A#, B, High C) with corresponding labels and holes to allow the user to blow air over a selected reed in order to produce a desired pitch. Pitch pipe 108 is larger (at about, e.g., 65 millimeters in diameter) and heavier (at about, e.g., 3 ounces) than an ordinary wristwatch; accordingly, primary band 104 is a very thick strap of leather (about, e.g., 2 millimeters) cut very wide (about, e.g., 40 millimeters) to keep pitch pipe 108 stable against the user's wrist. Adjustable buckle 112 and holes 114 are used to fit and secure apparatus 100 to wrists of various sizes. Pitch pipe 108 is fastened to auxiliary band 106 by replacing a central screw with longer post 110 extending through the leather of auxiliary band 106. Post 110 allows pitch pipe 108 to rotate with a moderate degree of freedom: pitch pipe 108 stays still until the user actively rotates pitch pipe 108 to point the desired pitch reed in the direction of the user's mouth. Advantageously, by inclusion of auxiliary band 106 in wristband 102 and attachment of post 110 directly to auxiliary band 106, post 110 does not come into direct contact with the user's wrist, thereby protecting the user's skin from chafing.

Figure 5:
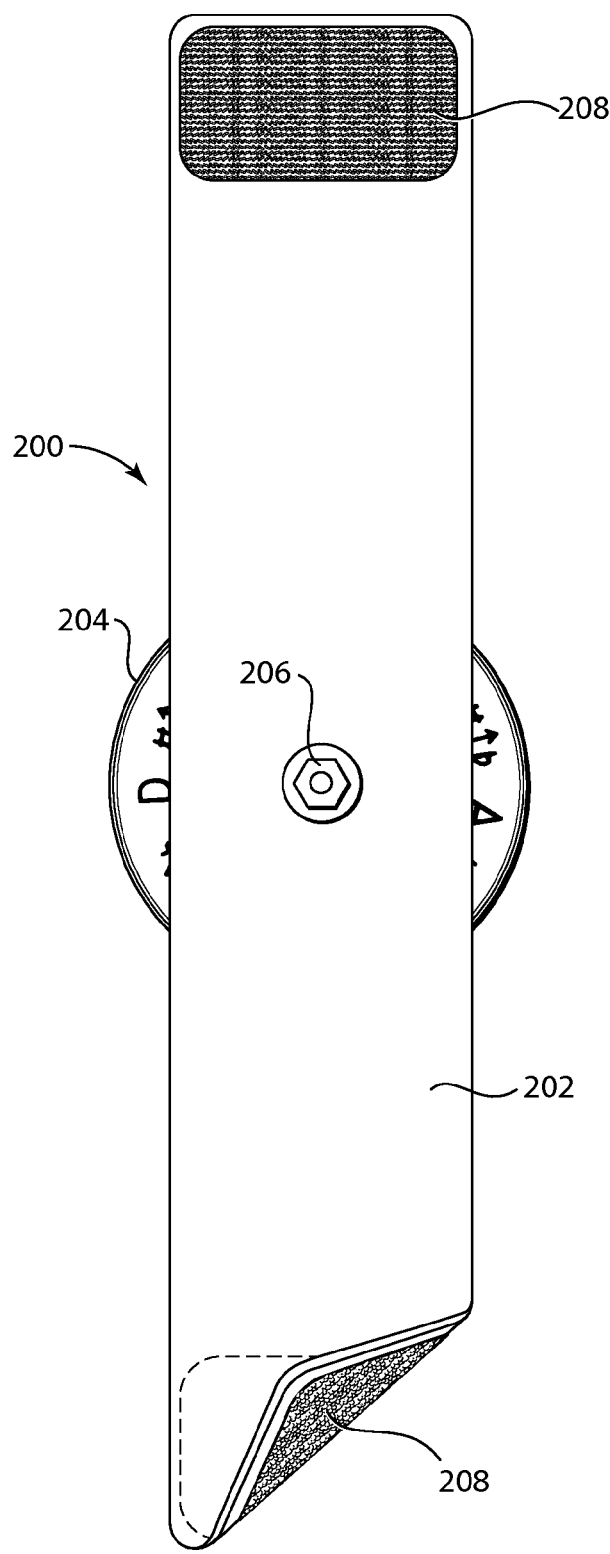
FIG. 5 is a bottom view of an apparatus of the invention that does not include an auxiliary band.

Referring to FIG. 5, apparatus 200 includes wristband 202 and pitch pipe 204 rotatably attached to wristband 202 by post 206. Wristband 202 also includes Velcro straps 208, which allow apparatus 200 to be fitted and secured to a user's wrist.

OTHER EMBODIMENTS

All publications, patents, and patent applications mentioned in the above specification are hereby incorporated by reference.

Various modifications and variations of the described method and system of the invention will be apparent to those skilled in the art without departing from the scope and spirit of the invention. For example, any appropriately-sized pitch pipe may be used in the apparatuses and methods of the invention. Likewise, any wristband capable of securing a pitch pipe, e.g., a wristband that is similar or identical to watch bands known in the art, may be used.

Although the invention has been described in connection with specific embodiments, it should be understood that the invention as claimed should not be unduly limited to such specific embodiments. Indeed, various modifications of the described modes for carrying out the invention that are obvious to those skilled in the art are intended to be within the scope of the invention.

Other embodiments are in the claims.

What is claimed is:

1. An apparatus comprising:
 a) a wristband comprising a primary band and an auxiliary band, wherein at least a portion of said auxiliary band is disposed above the outer surface of said primary band and wherein said auxiliary band is attached to said primary band by at least both ends of said auxiliary band; and
 b) a pitch pipe rotatably attached to said wristband, said pitch pipe comprising a post disposed through the center of said pitch pipe, wherein said post is rotatably attached to said auxiliary band and does not penetrate said primary band,
 wherein said apparatus is disposed to be worn on a user's wrist.

2. The apparatus of claim 1, wherein said auxiliary band is woven through said primary band and comprises a plurality of non-contiguous portions disposed above the outer surface of said primary band.

3. The apparatus of claim 2, further comprising a plurality of decorative rings disposed between said primary band and said auxiliary band.

4. The apparatus of claim 1, wherein the thickness of said primary band is about 2 millimeters.

5. The apparatus of claim 1, wherein the width of said primary band is about 40 millimeters.

6. The apparatus of claim 1, wherein said wristband comprises leather.

7. The apparatus of claim 1, further comprising an adjustable mechanism for fitting said apparatus to said user's wrist.

8. The apparatus of claim 7, wherein said adjustable mechanism comprises a buckle attached to one end of said wristband and a plurality of holes at the other end of said wristband.

9. The apparatus of claim 7, wherein said adjustable mechanism comprises Velcro attached to each end of said wristband.

10. The apparatus of claim 1, wherein said pitch pipe comprises:
 i) a plurality of metal reeds inside said pitch pipe; and
 ii) proximal to each said reed, an opening in said pitch pipe to allow said user to blow air over said reed, thereby causing said reed to resonate at a preselected frequency.

11. The apparatus of claim 10, wherein said pitch pipe comprises 13 metal reeds substantially tuned to Middle C, C#, D, D#, E, F, F#, G, G#, A, A#, B, and High C, respectively.

12. The apparatus of claim 1, wherein said pitch pipe is substantially disk-shaped.

13. The apparatus of claim 12, wherein the diameter of said pitch pipe is about 65 millimeters.

14. A method of using the apparatus of claim 1, said method comprising the steps of:
 fastening said apparatus to a user's wrist; and
 blowing air into said pitch pipe, thereby producing a desired pitch.

* * * * *